US011683458B2

(12) United States Patent
Slutsky et al.

(10) Patent No.: US 11,683,458 B2
(45) Date of Patent: Jun. 20, 2023

(54) PROJECTING MULTI-FACETED IMAGE ONTO CONVEX POLYHEDRON BASED ON WIDE-ANGLE IMAGE

(71) Applicant: GM Global Technology Operations LLC, Detroit, MI (US)

(72) Inventors: Michael Slutsky, Kefar-Saba (IL); Albert Shalumov, Petah Tikwa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 175 days.

(21) Appl. No.: 17/388,794

(22) Filed: Jul. 29, 2021

(65) Prior Publication Data
US 2023/0031894 A1 Feb. 2, 2023

(51) Int. Cl.
H04N 9/31 (2006.01)
B60K 35/00 (2006.01)
H04N 23/698 (2023.01)

(52) U.S. Cl.
CPC .......... *H04N 9/3176* (2013.01); *B60K 35/00* (2013.01); *H04N 23/698* (2023.01); *B60K 2370/176* (2019.05); *B60K 2370/334* (2019.05)

(58) Field of Classification Search
CPC .............. H04N 9/3176; H04N 23/698; B60K 2370/176; B60K 2370/334; G06T 3/0062
See application file for complete search history.

(56) References Cited

U.S. PATENT DOCUMENTS

2002/0141659 A1* 10/2002 Florin ................... G06T 15/205
382/285
2019/0182473 A1* 6/2019 Macmillan ........... H04N 13/334

\* cited by examiner

Primary Examiner — Kathleen V Nguyen
(74) Attorney, Agent, or Firm — Vivacqua Crane PLLC (57) ABSTRACT

Systems and methods for projecting a multi-faceted image onto a convex polyhedron based on an input image are described. A system can include a controller configured to determine a mapping between pixels within a wide-angle image and a multi-faceted image, and generate the multi-faceted image based on the mapping.

17 Claims, 6 Drawing Sheets

PROJECTING MULTI-FACETED IMAGE ONTO CONVEX POLYHEDRON BASED ON WIDE-ANGLE IMAGE

INTRODUCTION

The technical field generally relates to generating an image, and more particularly projecting a multi-faceted image onto a convex polyhedron based on an input image.

Vehicles (e.g., automobiles, farm equipment, automated factory equipment, construction equipment) increasingly include sensor systems that facilitate augmented or automated actions. A camera (e.g., still, video) facilitates target classification (e.g., pedestrian, truck, tree) using a neural network processor, for example. In autonomous driving, sensors should cover three hundred and sixty-degrees around the vehicle. However, different types of sensors obtain different types of information in different coordinate spaces.

SUMMARY

A system for projecting a multi-faceted image on a convex polyhedron is provided. The system can include a controller configured to determine a mapping between pixels within a wide-angle image and a multi-faceted image, and generate the multi-faceted image based on the mapping.

In other features, each facet of the multi-faceted image comprises a plurality of pixels from a subset of the wide-angle image.

In other features, the controller is further configured to receive the wide-angle image from a camera.

In other features, the system includes the camera.

In other features, the camera comprises a fisheye camera.

In other features, the controller is further configured to determine the mapping based according to a standard fisheye equidistant model:

$$u_F = u_{F,0} + c_F \theta \cos \phi, \text{ and}$$

$$v_F = v_{F,0} + c_F \theta \sin \phi,$$

where $u_F$ and $v_F$ are pixel locations of the pixels within the wide-angle image, $c_F$, $u_{F,0}$ and $v_{F,0}$ are intrinsic camera parameters, $\theta = \arccos(n_{F,Z})$ and $\phi = \arctan 2(n_{F,Y}, n_{F,X})$, where $n_{F,X}$, $n_{F,Y}$, and $n_{F,Z}$ comprise a respective pixel unit vector corresponding to a Cartesian coordinate system.

In other features, the multi-faceted image includes at least a first facet, a second facet, and a third facet.

A method for projecting a multi-faceted image on a convex polyhedron is disclosed. The method can include determining, by a controller, a mapping between pixels within a wide-angle image and a multi-faceted image, and generating, by the controller, the multi-faceted image based on the mapping.

In other features, each facet of the multi-faceted image comprises a plurality of pixels from a subset of the wide-angle image.

In other features, the method includes receiving the wide-angle image from a camera.

In other features, the camera comprises a fisheye camera.

In other features, the mapping is determining according to:

$$u_F = u_{F,0} + c_F \theta \cos \phi, \text{ and}$$

$$v_F = v_{F,0} + c_F \theta \sin \phi,$$

where $u_F$ and $v_F$ are pixel locations of the pixels within the wide-angle image, $c_F$, $u_{F,0}$ and $v_{F,0}$ are intrinsic camera parameters, $\theta = \arccos(n_{F,Z})$ and $\phi = \arctan 2(n_{F,Y}, n_{F,X})$, where $n_{F,X}$, $n_{F,Y}$, and $n_{F,Z}$ comprise a respective pixel unit vector corresponding to a Cartesian coordinate system.

In other features, the multi-faceted image includes at least a first facet, a second facet, and a third facet.

In other features, the multi-faceted image comprises a multi-faceted piece-wise projective image.

A vehicle including a system for projecting a multi-faceted image on a convex polyhedron is disclosed. The system can include a controller configured to determine a mapping between pixels within a wide-angle image and a multi-faceted image, and generate the multi-faceted image based on the mapping.

In other features, each facet of the multi-faceted image comprises a plurality of pixels from a subset of the wide-angle image.

In other features, the controller is further configured to receive the wide-angle image from a camera.

In other features, the system includes the camera.

In other features, the camera comprises a fisheye camera.

In other features, the controller is further configured to determine the mapping based according to:

$$u_F = u_{F,0} + c_F \theta \cos \phi, \text{ and}$$

$$v_F = v_{F,0} + c_F \theta \sin \phi,$$

where $u_F$ and $v_F$ are pixel locations of the pixels within the wide-angle image, $c_F$, $u_{F,0}$ and $v_{F,0}$ are intrinsic camera parameters, $\theta = \arccos(n_{F,Z})$ and $\phi = \arctan 2(n_{F,Y}, n_{F,X})$, where $n_{F,X}$, $n_{F,Y}$, and $n_{F,Z}$ comprise a respective pixel unit vector corresponding to a Cartesian coordinate system.

In other features, the multi-faceted image includes at least a first facet, a second facet, and a third facet.

BRIEF DESCRIPTION OF THE DRAWINGS

The exemplary implementations will hereinafter be described in conjunction with the following drawing figures, wherein like numerals denote like elements, and wherein.

DETAILED DESCRIPTION

Figure 1:
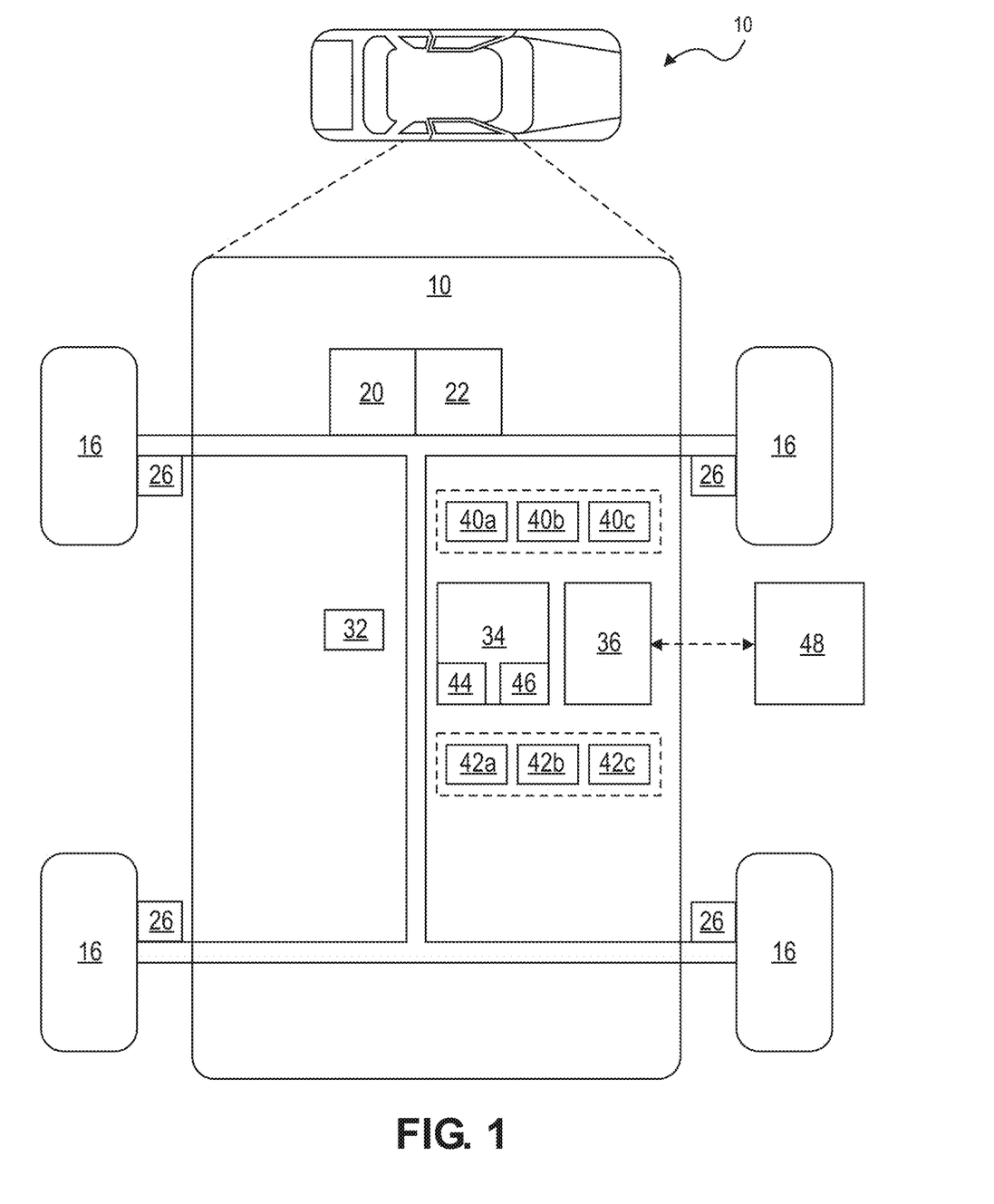
FIG. 1 is a schematic illustration of a vehicle including a controller configured to project a multi-faceted image on a convex polyhedron based on an input image.

With reference to FIG. 1, a vehicle 10 is shown in accordance with various implementations. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various implementations, the vehicle 10 is an autonomous vehicle. The autonomous vehicle is, for example, a vehicle that is automatically controlled to carry passengers from one location to another. The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the autonomous vehicle is an automation system of Level Two or higher. A Level Two automation system indicates "partial automation". However, in other implementations, the autonomous vehicle may be a so-called Level Three, Level Four or Level Five automation system. A Level Three automation system indicates conditional automation. A Level Four system indicates "high automation", referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various implementations, the transmission system 22 may include a step-ratio automatic transmission, a continuously-variable transmission, or other appropriate transmission. The brake system 26 is configured to provide braking torque to the vehicle wheels 16 and 18. The brake system 26 may, in various implementations, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc.

Figure 2:
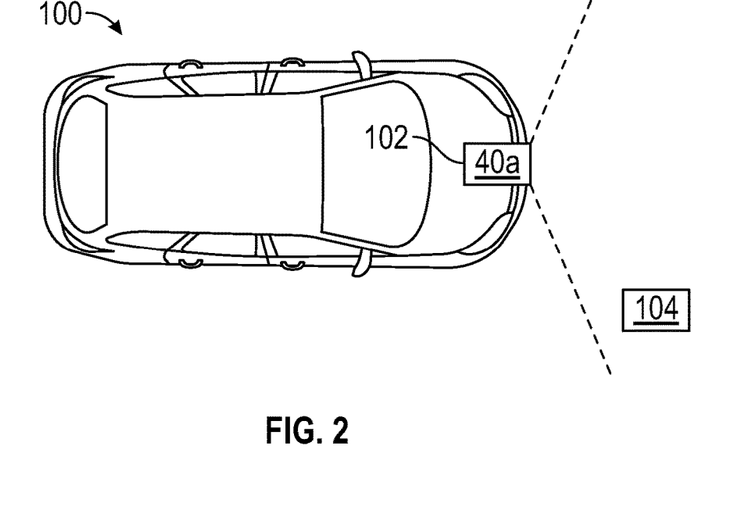
FIG. 2 is a schematic illustration of a vehicle including a wide-angle view camera.

The communication system 36 is configured to wirelessly communicate information to and from other entities 48, such as but not limited to, other vehicles ("V2V" communication) infrastructure ("V2I" communication), remote systems, and/ or personal devices (described in more detail with regard to FIG. 2). In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling functions of the vehicle 10. In various implementations, the data storage device 32 stores defined maps of the navigable environment. In various implementations, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling and executing functions of the vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, implementations of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Referring to FIG. 2, the sensing device 40a can comprise camera 102 that is configured to capture one or more images within a field-of-view (FOV) of the camera 102. In an example implementation, the camera 102 comprises a fisheye camera that includes an ultra-wide-angle lens that captures environments that result in images having a characteristic convex non-rectilinear appearance. While illustrated as being oriented towards a front end of the vehicle 10, it is understood that the camera 102 may be positioned in one or more other suitable locations around the vehicle 10 to capture the surrounding environment. When the camera 102 comprises a fisheye camera, the FOV of the camera 102 may be greater than or equal to one hundred and eighty degrees (≥180°). It is understood that the principles of this disclosure can also be applied to omnidirectional cameras, i.e., having a FOV up to three hundred and sixty degrees (360°).

Figure 3:
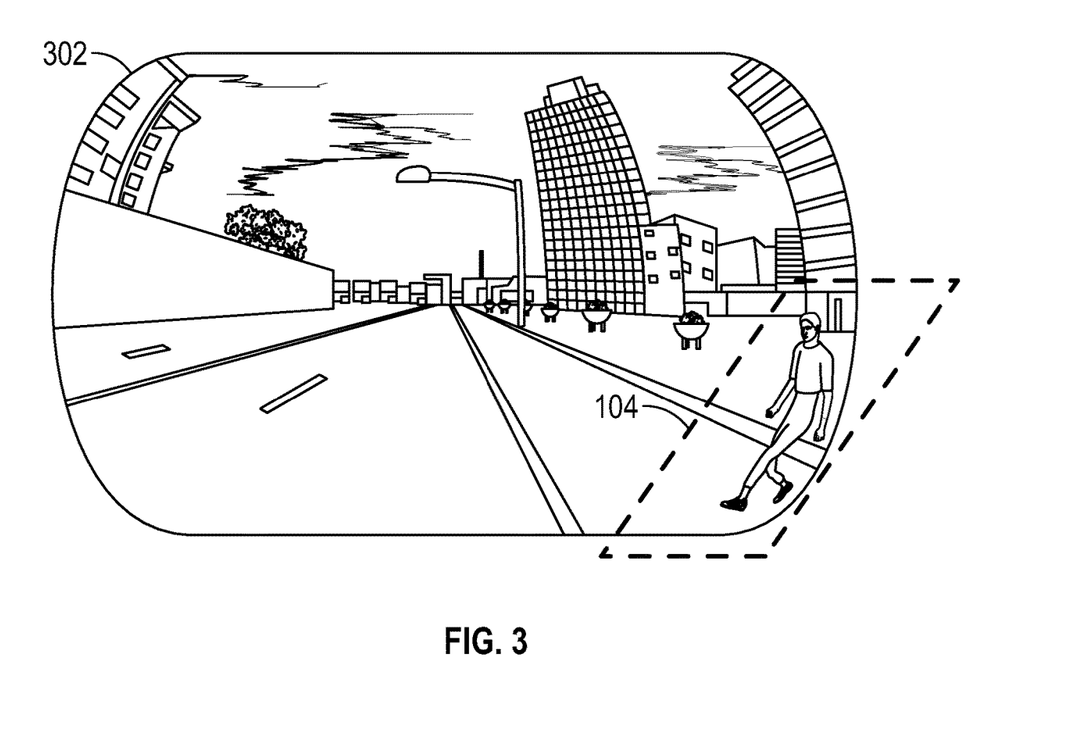
FIG. 3 is an example image captured by the wide-angle camera.

As the vehicle 10 traverses an environment 100, the camera 102 may capture one or more objects 104 within a FOV of the camera 102 (see FIGS. 2 and 3). Due to the configuration of fisheye camera lenses, objects, such as a person, depicted in a resulting image may be distorted as shown in FIG. 3.

As discussed herein, the controller 34 can transform an image generated by the camera 102 to a multi-faceted image. For example, the controller 34 projects an image onto a convex polyhedron as discussed in greater detail below with respect to FIGS. 4 through 6. In an example implementation, the controller 34 receives an image, such as image 302 shown in FIG. 3, captured by the camera 102 that includes the ultra-wide-angle lens. The controller 34 maps pixels within the wide-angle projective image to a multi-faceted piece-wise projective image. For example, the multi-faceted piece-wise projective image can include multiple facets, i.e., portions, that, when taken together, form the whole image.

Figure 4:
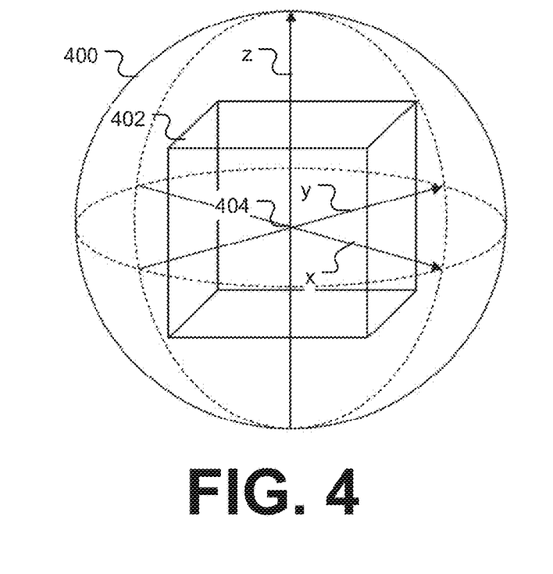
FIG. 4 is a schematic illustration of a unit sphere having a unit cube projected therein.

FIG. 4 illustrates an example unit sphere 400 that represents the camera 102 and a unit cube 402 projected therein. The unit sphere 400 includes a center 404 that represents a center of the camera 102 lens. The unit sphere 400 and the unit cube 402 can include x-, y-, and z-components that are translations according to a Cartesian coordinate system (comprising an X-axis, a Y-axis, and a Z-axis).

Figure 5:
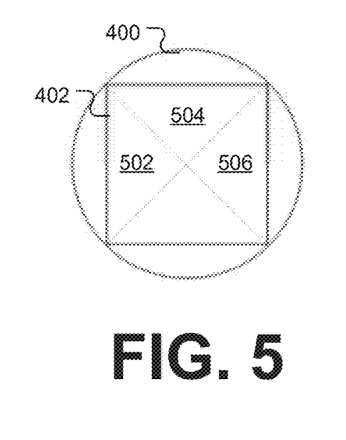
FIG. 5 is a perspective view of the unit sphere having the unit cube projected therein, where portions of the unit cube correspond to facets of an image.
Figure 6:
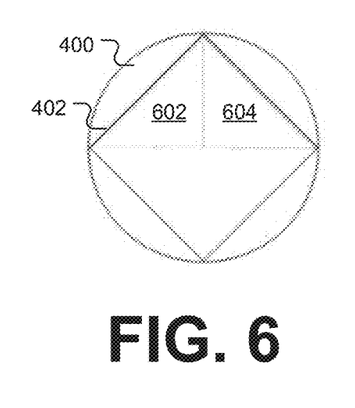
FIG. 6 is another perspective view of the unit sphere having the unit cube projected therein, where portions of the unit cube correspond to facets of an image.

As shown in FIGS. 5 and 6, the unit cube 402 can represent an image having multiple facets, and each facet can include a subset of pixels such that the generated image appears to have been captured by a camera having a narrower FOV than the fisheye camera. FIG. 5 illustrates an implementation in which the unit cube 402 includes three (3) facets 502, 504, 506, and FIG. 6 illustrates an implementation in which the unit cube 402 includes two (2) facets 602, 604.

Figure 7:
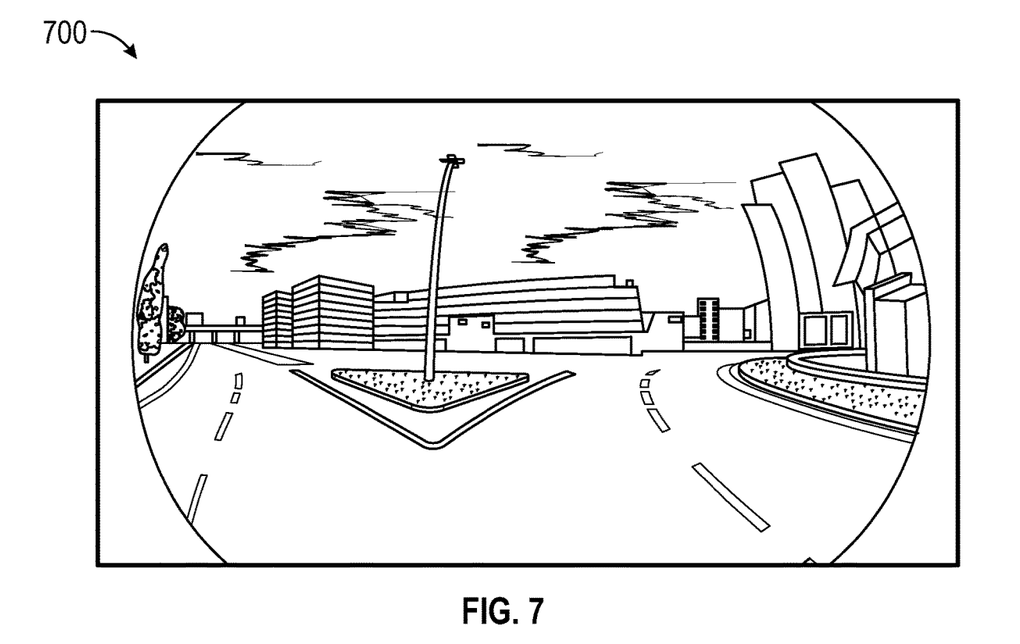
FIG. 7 is an example image captured by a wide-angle camera.
Figure 8:
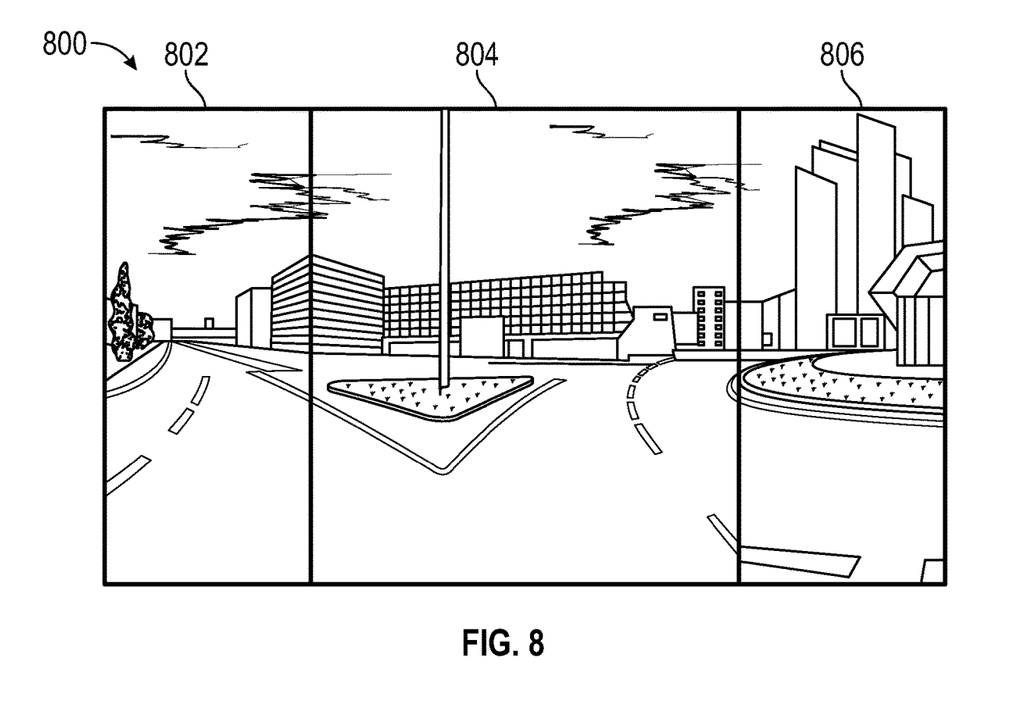
FIG. 8 is an example generated multi-faceted image generated based on the image shown in FIG. 7.
Figure 9:
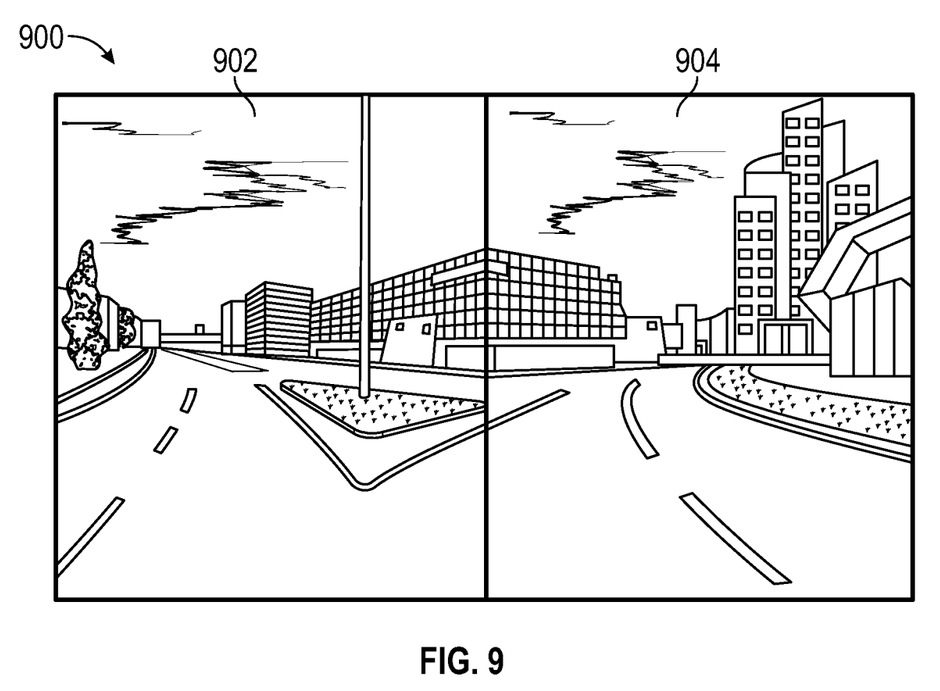
FIG. 9 is an example generated multi-faceted image generated based on the image shown in FIG. 7.

The controller 34 uses suitable image processing techniques to generate multiple facets of an image based on the image captured by the camera 102. The controller 34 can transform pixels captured by the camera 102, e.g., the fisheye camera, to corresponding facets to generate the multi-faceted image. The controller 34 can begin the transformation process by normalizing a pixel direction according to Equation 1:

$$[u, v, f]_f^T \rightarrow \frac{[u, v, f]_f^T}{\sqrt{u^2 + v^2 + f^2}} = n_k,$$ Equation 1 where the set $[u,v]_k$ represents a camera 102 pixel location in the kth facet (where k is an integer greater than or equal to one such as a first facet, a second facet, and so forth), f is a focal distance of the camera 102, T is a transpose for a column vector, and $n_k$ is a pixel unit vector for the kth facet. The controller 34 can then rotate the pixel unit vector (for a corresponding pixel having a Cartesian coordinate) according to Equation 2:

$$n_F = R_{Fk} n_k$$ Equation 2, where $R_{Fk}$ is a rotation matrix that connects the fisheye camera parameters to a desired camera parameter, i.e., camera having a narrower FOV than the fisheye camera. For example, the rotation matrix can include transformation data that maps fisheye camera parameters to which facet to include the pixels in, etc. The controller 34 can then determine corresponding fisheye camera pixels according to Equations 3 and 4:

$$u_F = u_{F,0} + c_F \theta \cos \phi$$ Equation 3, $$v_F = v_{F,0} + c_F \theta \sin \phi$$ Equation 4, where $u_F$ and $v_F$ are respective corresponding fisheye pixel locations, $c_F$ and the set $[u, v]_{F,0}$ are intrinsic fisheye camera parameters, and $\theta = \arccos(n_{F,Z})$ and $\phi = \arctan 2(n_{F,Y}, n_{F,X})$. The parameters $n_{F,X}$, $n_{F,Y}$, and $n_{F,Z}$ comprise a respective pixel unit vector within the corresponding X-axis, Y-axis, and Z-axis within the Cartesian coordinate system. Using the corresponding fisheye pixel locations, the controller 34 generates a multi-faceted image based on the determined mapping of fisheye camera pixels to the multi-faceted piecewise-projective image pixels. For example, the controller 34 inserts fisheye pixels using the location data into the corresponding Cartesian coordinate system. The resulting generated image can include less distortion with respect to the image generated by the fisheye camera, e.g., Referring to FIGS. 7 through 9, FIG. 7 illustrates another example image 700 captured by the camera 102. FIG. 8 illustrates an example generated image 800 that includes facets 802, 804, 806 based on the configuration discussed within respect to FIG. 5, and FIG. 9 illustrates an example generated image 900 that includes facets 902, 904 based on the configuration discussed within respect to FIG. 6.

Figure 10:
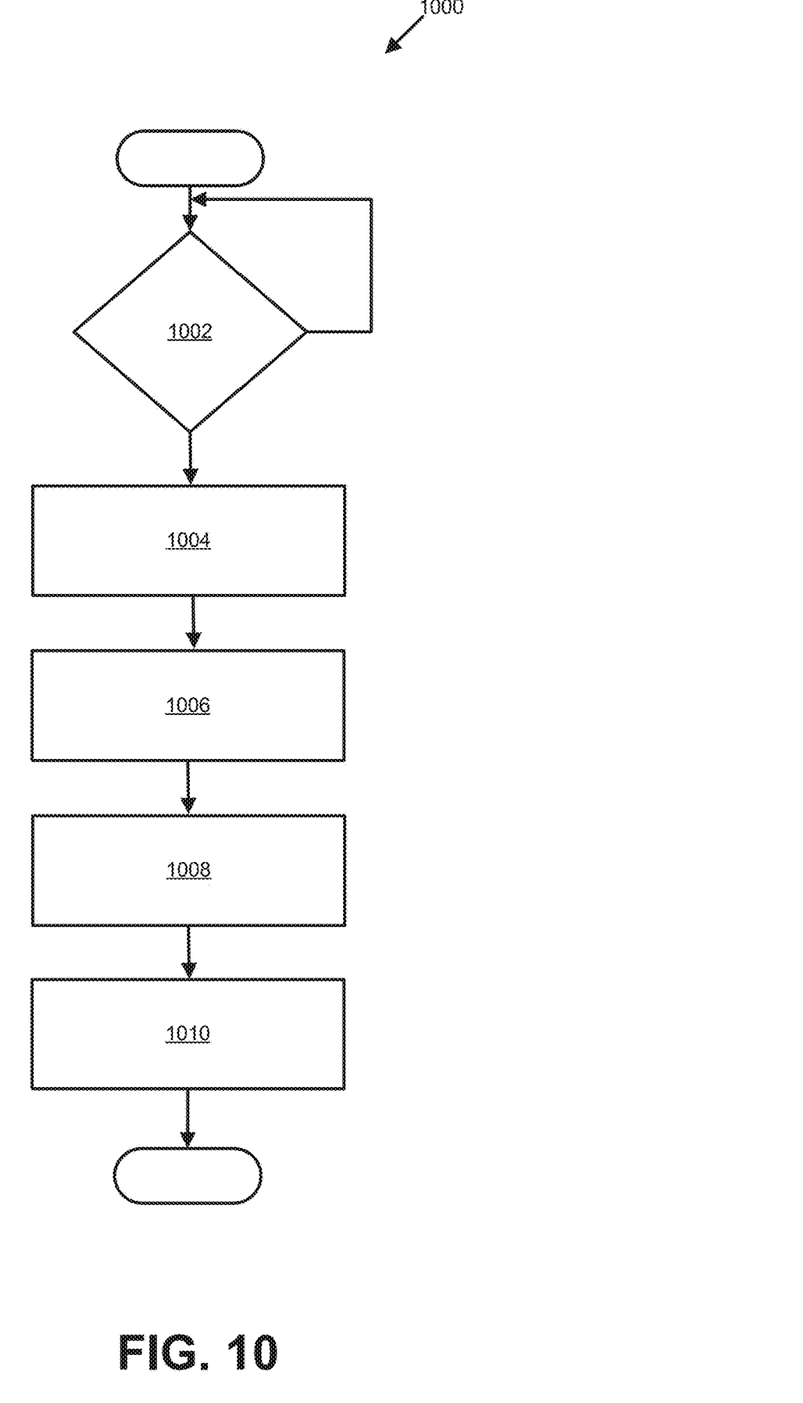
FIG. 10 is a flow diagram illustrating an example process for generating a multi-faceted image based on an input image.

FIG. 10 is a flow diagram is shown that illustrates an example process 1000 of generating a multi-faceted image based on an image captured by the camera 102, such as a fisheye camera. The process 1000 comprises software instructions executable by the controller 34, e.g., the processor 44 and the computer readable storage device or media 46.

The process 1000 begins at block 1002 in which a determination is made whether an image, such as a wide-angle projective image, has been received. If an image has not been received, the process 1000 returns to block 1002. Otherwise, the controller 34 normalizes the pixel direction(s) at block 1004. At block 1006, the controller 34 rotates the pixel unit vector. At block 1008, the controller 34 determines corresponding fisheye camera pixels. At block 1010, the controller 34 generates the multi-faceted image based on the determined mapping between fisheye pixels to multi-faceted piecewise-projective image pixels. The process 1000 then ends.

While at least one exemplary implementation has been presented in the foregoing detailed description, it should be appreciated that a vast number of variations exist. It should also be appreciated that the exemplary implementation or exemplary implementations are only examples, and are not intended to limit the scope, applicability, or configuration of the disclosure in any way. Rather, the foregoing detailed description will provide those skilled in the art with a convenient road map for implementing the exemplary implementation or exemplary implementations. It should be understood that various changes can be made in the function and arrangement of elements without departing from the scope of the disclosure as set forth in the appended claims and the legal equivalents thereof.

The detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Implementations of the present disclosure may be described herein in terms of functional and/or logical block components and various processing steps. It should be appreciated that such block components may be realized by any number of hardware, software, and/or firmware components configured to perform the specified functions. For example, an implementation of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations of the present disclosure may be practiced in conjunction with any number of systems, and that the systems described herein is merely exemplary implementations of the present disclosure.

What is claimed is:

1. A system for projecting a multi-faceted image on a convex polyhedron based on an input image, the system comprising:
   a controller configured to:
   determine a mapping between pixels within a wide-angle image and a multi-faceted image; and
   generate the multi-faceted image based on the mapping,
   wherein the controller is further configured to determine the mapping based according to:

$u_F = u_{F,0} + c_F \theta \cos \phi$, and $v_F = v_{F,0} + c_F \theta \sin \phi$, where $u_F$ and $v_F$ are pixel locations of the pixels within the wide-angle image, $c_F$, $u_{F,0}$ and $v_{F,0}$ are intrinsic camera parameters, $\theta = \arccos(n_{F,Z})$ and $\phi = \arctan 2(n_{F,Y}, n_{F,X})$, where $n_{F,X}$, $n_{F,Y}$, and $n_{F,Z}$ comprise a respective pixel unit vector corresponding to a Cartesian coordinate system.

2. The system of claim 1, wherein each facet of the multi-faceted image comprises a plurality of pixels from a subset of the wide-angle image.

3. The system of claim 1, wherein the controller is further configured to receive the wide-angle image from a camera.

4. The system of claim 3, further comprising the camera.

5. The system of claim 4, wherein the camera comprises a fisheye camera.

6. The system of claim 1, wherein the multi-faceted image includes at least a first facet, a second facet, and a third facet.

7. A method for projecting a multi-faceted image on a convex polyhedron, the method comprising:
   determining, by a controller, a mapping between pixels within a wide-angle image and a multi-faceted image; and
   generating, by the controller, the multi-faceted image based on the mapping,
   wherein the mapping is determining according to:

$u_F = u_{F,0} + c_F \theta \cos \phi$, and $v_F = v_{F,0} + c_F \theta \sin \phi$, where $u_F$ and $v_F$ are pixel locations of the pixels within the wide-angle image, $c_F$, $u_{F,0}$ and $v_{F,0}$ are intrinsic camera parameters, $\theta = \arccos(n_{F,Z})$ and $\phi = \arctan 2(n_{F,Y}, n_{F,X})$, where $n_{F,X}$, $n_{F,Y}$, and $n_{F,Z}$ comprise a respective pixel unit vector corresponding to a Cartesian coordinate system.

8. The method of claim 7, wherein each facet of the multi-faceted image comprises a plurality of pixels from a subset of the wide-angle image.

9. The method of claim 7, the method further comprising: receiving the wide-angle image from a camera.

10. The method of claim 9, wherein the camera comprises a fisheye camera.

11. The method of claim 7, wherein the multi-faceted image includes at least a first facet, a second facet, and a third facet.

12. The method of claim 7, wherein the multi-faceted image comprises a multi-faceted piece-wise projective image.

13. A vehicle, comprising a system for projecting a multi-faceted image on a convex polyhedron based on an input image, the system comprising:
    a controller, configured to
    determine a mapping between pixels within a wide-angle image and a multi-faceted image; and
    generate the multi-faceted image based on the mapping,
    wherein the controller is further configured to determine the mapping based according to:

$u_F = u_{F,0} + c_F \theta \cos \phi$, and $v_F = v_{F,0} + c_F \theta \sin \phi$, where $u_F$ and $v_F$ are pixel locations of the pixels within the wide-angle image, $c_F$, $u_{F,0}$ and $v_{F,0}$ are intrinsic camera parameters, $\theta = \arccos(n_{F,Z})$ and $\phi = \arctan 2(n_{F,Y}, n_{F,X})$, where $n_{F,X}$, $n_{F,Y}$, and $n_{F,Z}$ comprise a respective pixel unit vector corresponding to a Cartesian coordinate system.

14. The vehicle of claim 13, wherein each facet of the multi-faceted image comprises a plurality of pixels from a subset of the wide-angle image.

15. The vehicle of claim 13, wherein the controller is further configured to receive the wide-angle image from a camera.

16. The vehicle of claim 15, further comprising the camera.

17. The vehicle of claim 16, wherein the camera comprises a fisheye camera.

* * * * *